United States Patent [19]
Yuen

[11] Patent Number: 5,245,266
[45] Date of Patent: Sep. 14, 1993

[54] BATTERY CHARGER FOR BATTERIES OF DIFFERING DIMENSIONS

[76] Inventor: Michael M. Yuen, 4225 Via Arbolada, #594, Los Angeles, Calif. 90042

[21] Appl. No.: 788,479

[22] Filed: Nov. 6, 1991

[51] Int. Cl.⁵ .................. H02J 7/00; H01M 10/46
[52] U.S. Cl. .................................. 320/2; 320/15
[58] Field of Search .............. 320/2, 5, 6, 14, 15, 320/16, 20, 21, 22, 23, 24; 455/89, 90

[56] References Cited

U.S. PATENT DOCUMENTS

| | | | |
|---|---|---|---|
| 4,303,876 | 12/1981 | Kelly, III et al. | 320/2 |
| 4,558,270 | 12/1985 | Liautaud et al. | 320/2 |
| 4,636,703 | 1/1987 | Tohya et al. | 320/2 |
| 4,873,479 | 10/1989 | Iimura et al. | 320/2 |
| 4,963,812 | 10/1990 | Mischenko et al. | 320/2 |
| 5,065,082 | 11/1991 | Fushiya | 320/2 |
| 5,162,719 | 11/1992 | Tomura et al. | 320/2 |

Primary Examiner—Steven L. Stephan
Assistant Examiner—Kristine Peckman
Attorney, Agent, or Firm—Ladas & Parry

[57] ABSTRACT

A battery charger comprises a housing, charging means in the housing which, in use, for connection to an electrical outlet and an upper plate releasably attached to the housing, the upper plate having battery receiving means to accommodate a predetermined size battery, the housing being adapted to receive upper plates which differ in formation so as to receive batteries of different dimension.

22 Claims, 8 Drawing Sheets

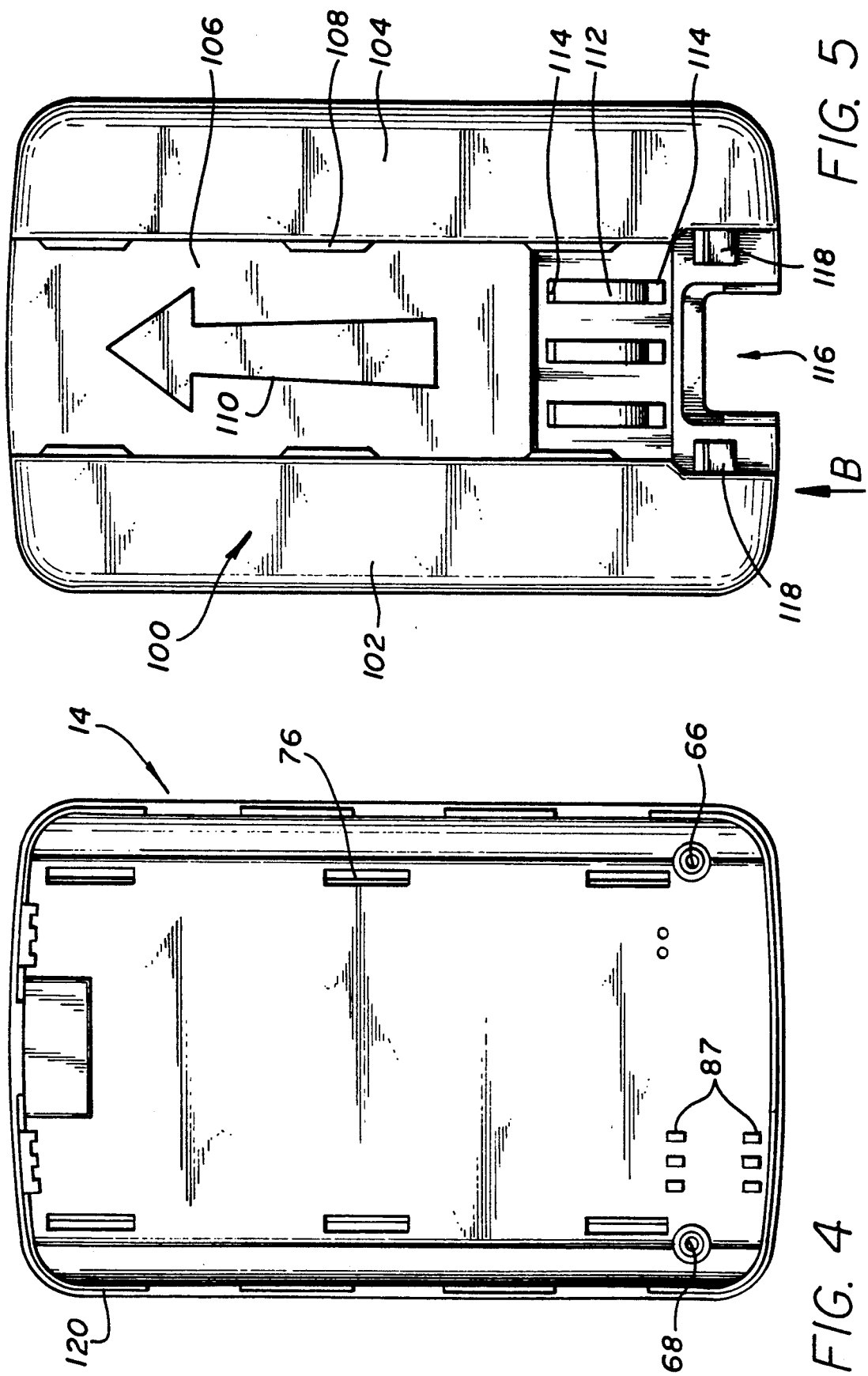

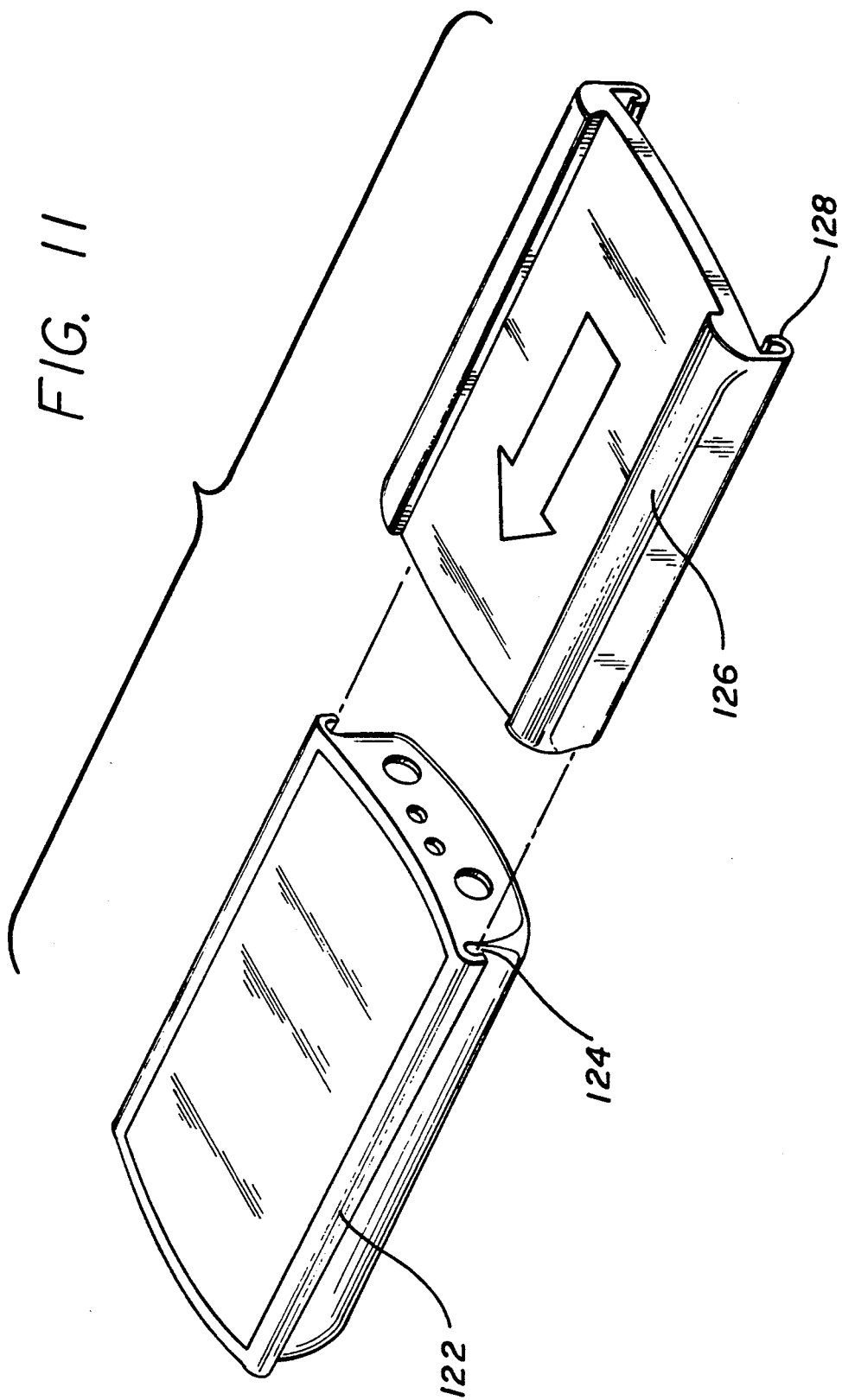

BATTERY CHARGER FOR BATTERIES OF DIFFERING DIMENSIONS

BACKGROUND OF THE INVENTION

This invention relates to a battery charging device, and is particularly useful for charging batteries of portable telephones. However, the device of the invention may also have application in charging batteries used in a wide variety of other applications, such as in video cameras, portable cameras and the like.

Portable telephones and other portable devices which require electrical energy to operate frequently use rechargeable batteries. Such batteries are releasably attachable to the portable telephone, provide the necessary energy, and discharge over a period of time and during use. The battery may then be removed ad placed in a battery charging device which is supplied with energy from a conventional electric outlet in a home, office or car. After a given period of time, depending on the nature and specifications of the battery, the battery can be recharged and is then available for further use.

It will be appreciated that there are a large number of rechargeable batteries on the market, each battery having a particular size, structure, power requirement and other features. For this reason, each type of battery typically requires its own specialized and custom designed battery charger.

U.S. Pat. No. 4,974,250 (Tomiyori) teaches an adaptor for mounting a portable telephone on a vehicle. The adaptor allows either one of a simple handset and a multi-function handset to be used as desired. When a multi-function handset is used with the adaptor, the adaptor is switched on and off by a power switch provided on the handset. When a simple handset is used, the adaptor is switched on and off by an ignition switch which is provided on the vehicle.

U.S. Pat. No. 4,963,812 (Mischenko) discloses a battery charger housing for batteries of differing dimensions. Batteries for charging are inserted into a recess in the battery charger housing and are captivated by a lip portion which extends into the recess. The lip portion has a plurality of surfaces, one of which surfaces contacts a surface of a battery of one size and maintains the position of the battery against the charging contacts of the battery charger. Different size batteries contact different lip surfaces. Mischenko provides only a single bottom surface for receiving the battery, and the possible use for a wide-ranging variation of battery sizes is very limited.

U.S. Pat. No. 4,850,006 (Sasaki) discloses a booster and charger unit used for hand-held portable telephones. It is capable of preventing a casing of the unit from being heated to an excessive temperature. The casing has therein a charging device for charging a battery, and a temperature sensor responsive to the temperature of the casing. The unit does not appear capable of charging batteries of different sizes U.S. Design Pat. No. 307,016 (Watanabe) illustrates a charger for a portable radio telephone. The design patent illustrates the particular design of a charger, and appears capable of receiving only a specific size battery.

SUMMARY OF THE INVENTION

According to one aspect of the invention, there is provided a battery charger comprising: a housing; charging means in the housing which, in use, connects to an electrical outlet; an upper plate releasably attached to the housing, the upper plate having battery receiving means to accommodate a predetermined size battery, the housing being adapted to receive upper plates which differ in formation so as to receive batteries of different dimension.

Conveniently, the housing comprises a base and side wall which define a chamber, the chamber accommodating the charging means, and there may be an intermediate plate between the housing and the upper plate, the charging means being enclosed by the housing and intermediate plate.

Preferably, the upper plate comprises a flat surface, a pair of edgewalls defining a battery receiving area, and tracking means for properly guiding a battery into position on the upper plate. The upper plate may further comprise electrical contacts for contacting the battery, the electrical contacts also being connected to the charging means. The upper plate comprises a peripheral flange and the housing comprises a peripheral shelf, the flange being receivable on the shelf to facilitate attachment between the housing and the upper plate.

Preferably, the electrical connecting means comprises a multiple pin assembly in the housing, the multiple pin assembly being connected to the charging means, and a socket member attached to the upper plate, the socket member being connectable to the multiple pin assembly. The multiple pin assembly may comprise five pins, wherein two of the pins are for transmitting charge from the charging means to the upper plate, and the socket member comprises five apertures to receive the five pins, wherein two of the apertures correspond to the two pins for transmitting charge and transmit electric charge to battery contact means on the upper plate. Three pins of the multiple pin assembly and three apertures in the socket member operate as switching means, the configuration of the three pins in relation to the three apertures determining the level and extent of electrical charge being transmitted to the upper plate.

In another embodiment, the housing may comprise a rolled flange along the edge thereof, the rolled flange defining a groove, and the upper plate comprises a flange along its edge, the flange of the upper plate being slideably received in the groove of the rolled flange on the housing so that the upper plate slides on and off the housing for easy removal and replacement.

BRIEF DESCRIPTION OF THE DRAWINGS

FIG. 4 is an underside view of the top plate shown in FIG. 2;

FIG. 5 is a top view of a second upper plate of a battery charging device;

Figure 8:
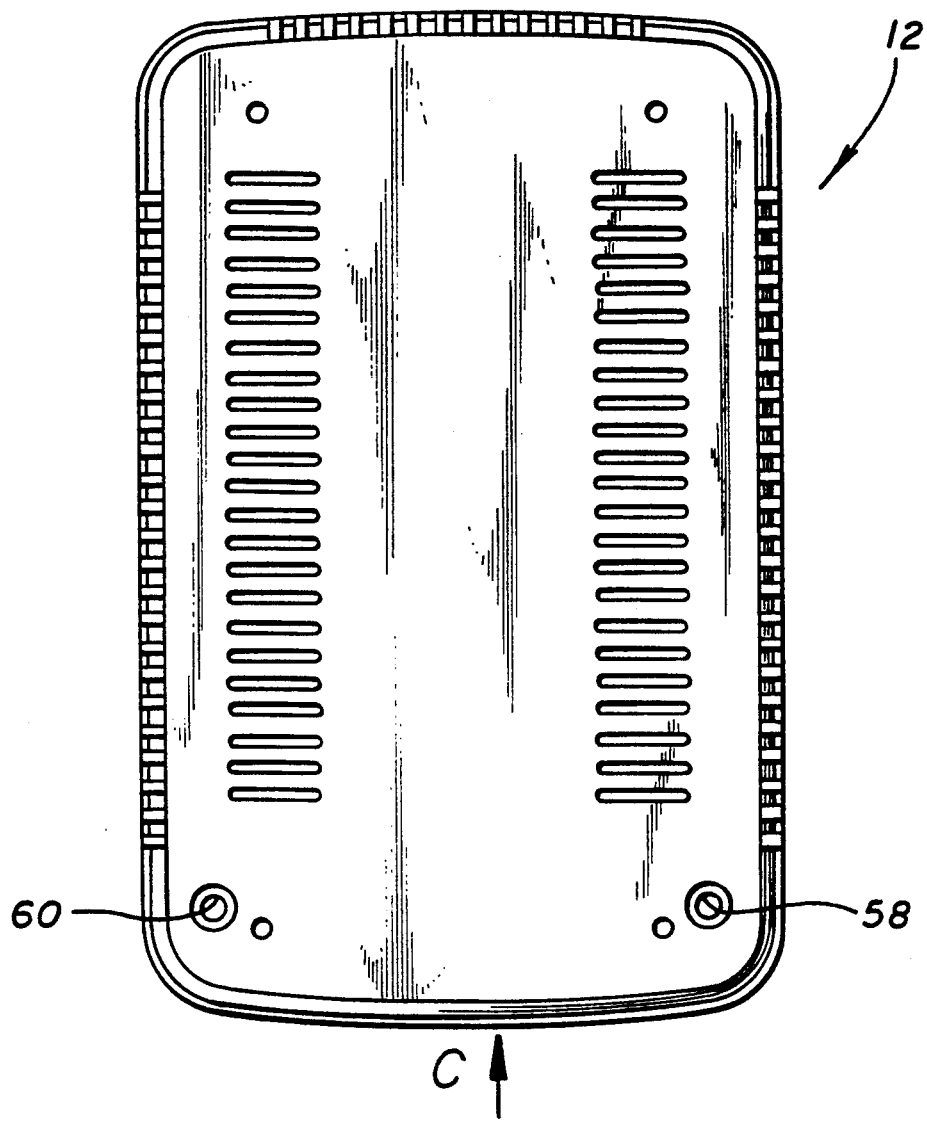
Figure 9:
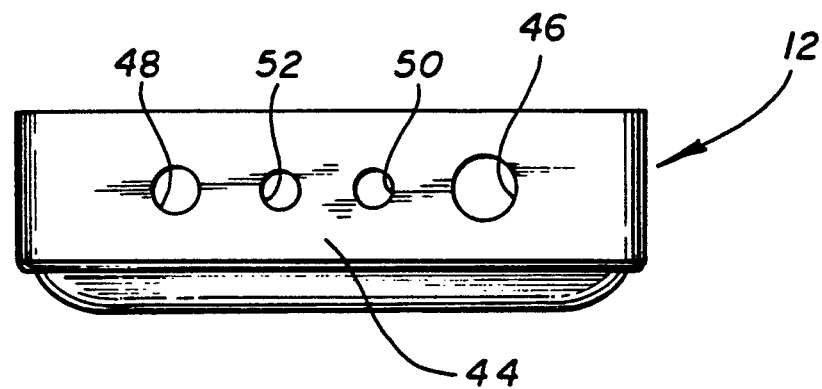
Figure 10A:
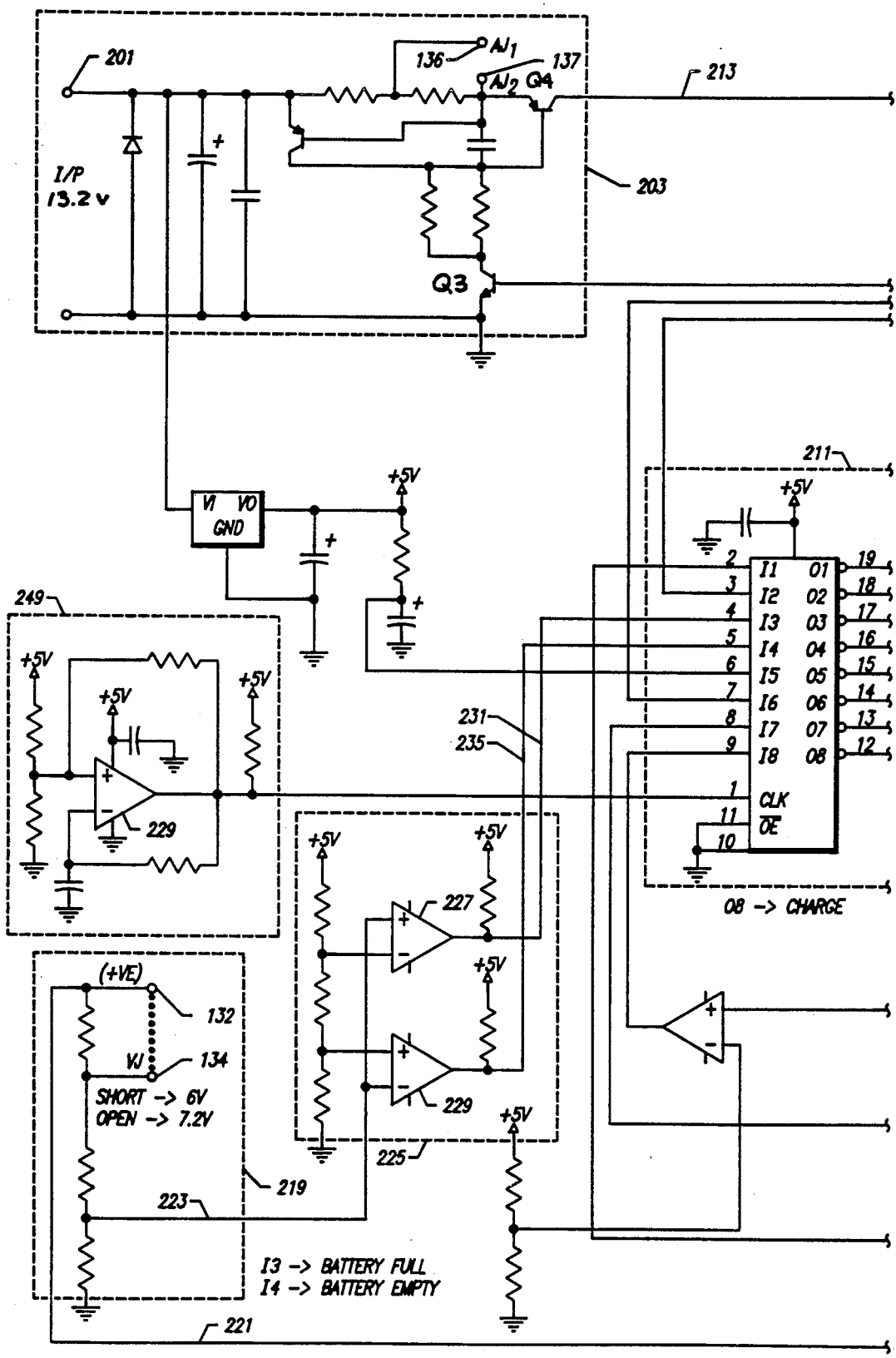
Figure 10B:
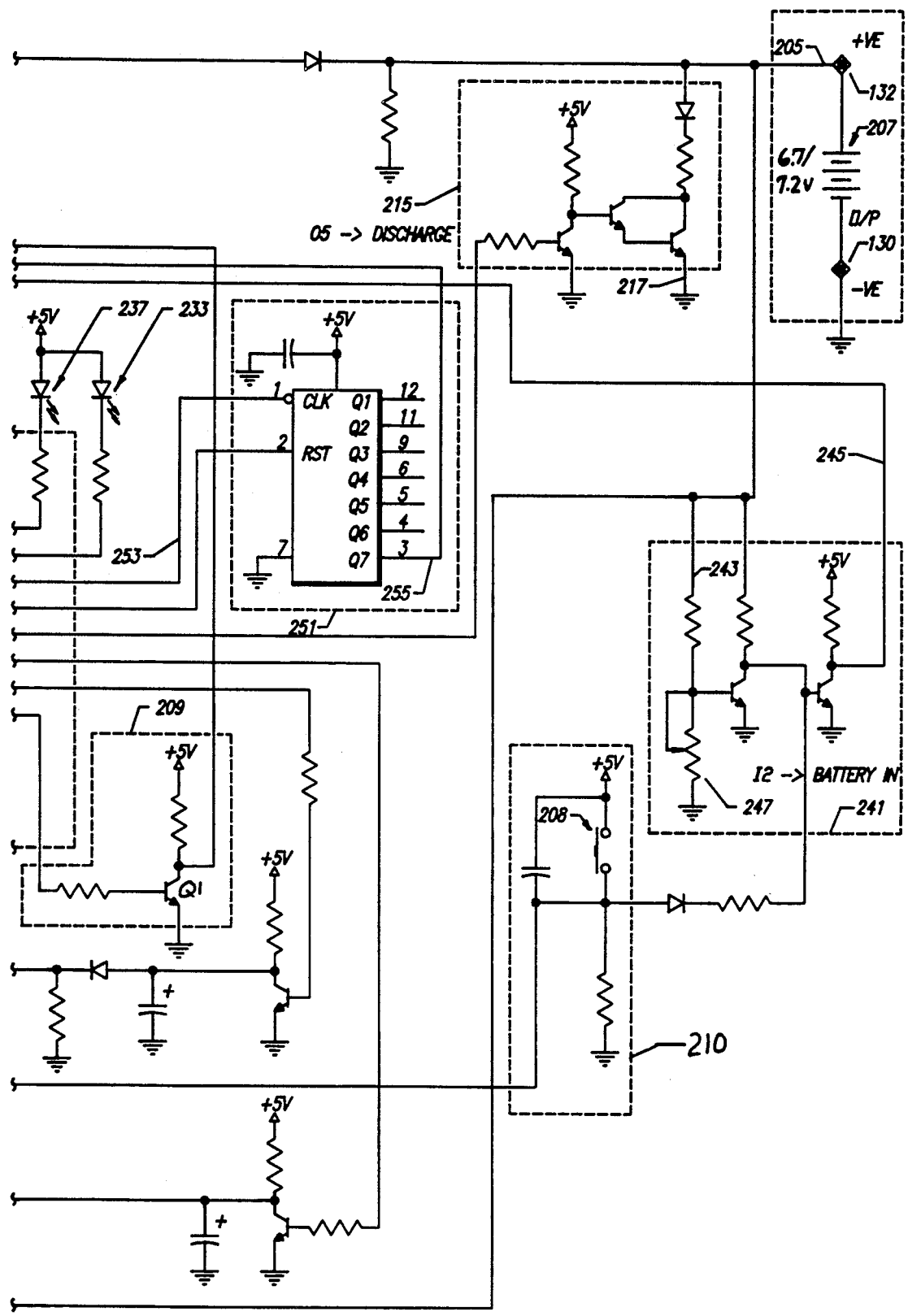

7 is an underside view of the top plate shown in FIG. 5;

FIG. 8 is an underside view of the lower casing of the battery charging device;

FIG. 9 is a end view of the casing shown in FIG. 8 from the direction of arrow C;

FIGS. 10A and 10B show an embodiment of a circuit for use in the battery charging device;

FIG. 11 shows an alternative method of affixing the top plate to the lower casing.

DETAILED DESCRIPTION OF THE PREFERRED EMBODIMENTS

Referring to the drawings, there is shown a battery charger 10 which, in the present instance, is suitable for charging rechargeable batteries used for portable telephones. The battery charger 10 comprises a lower casing 12, an upper plate 14 and an intermediate plate 16. The upper plate 14, intermediate plate 16 and lower casing 12 are attached to each other by a pair of screws 18a and 18b, as will be described in further detail below.

Figure 1:
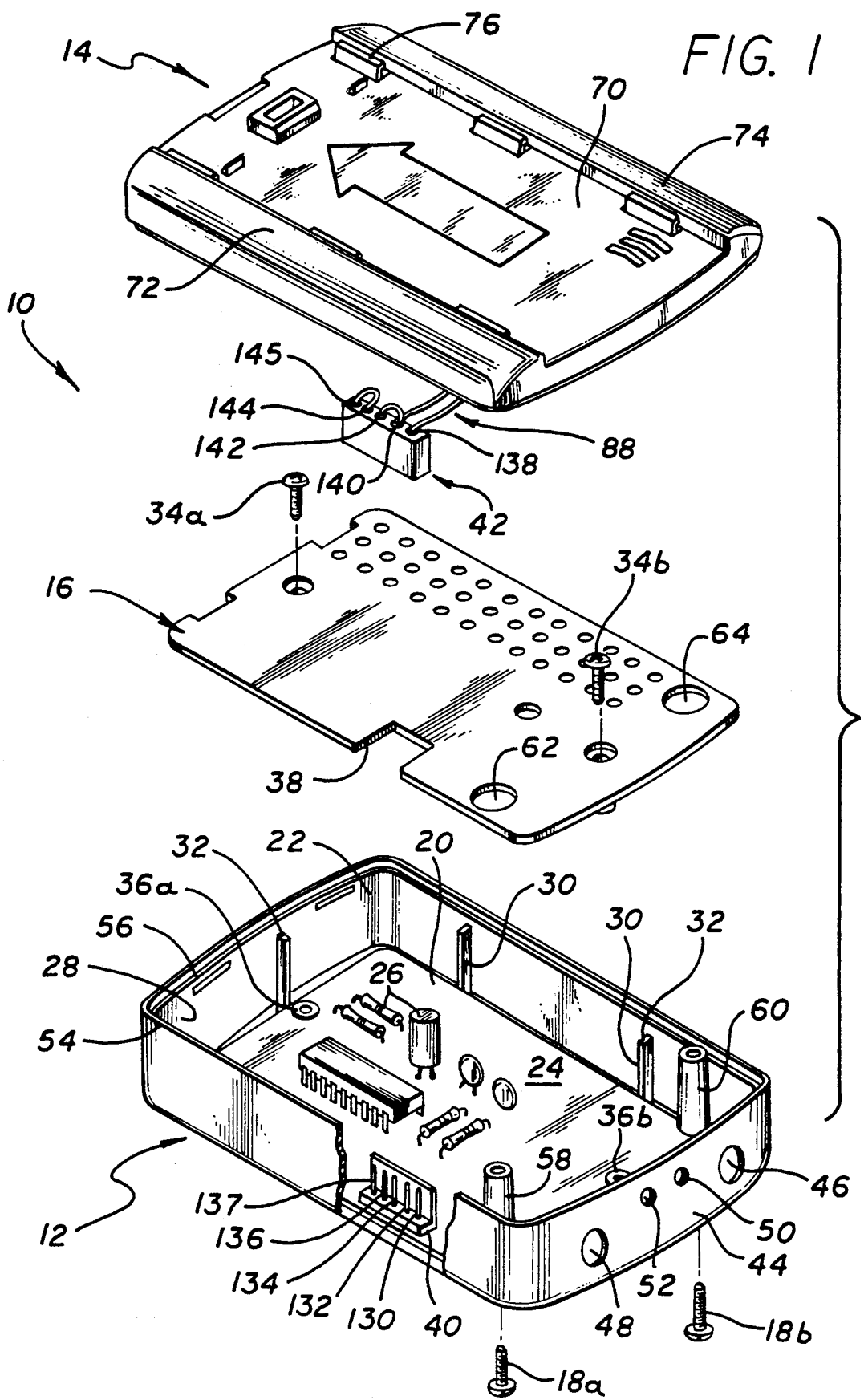
FIG. 1 is a perspective view of one embodiment of a telephone charging device of the invention.
Figure 2:
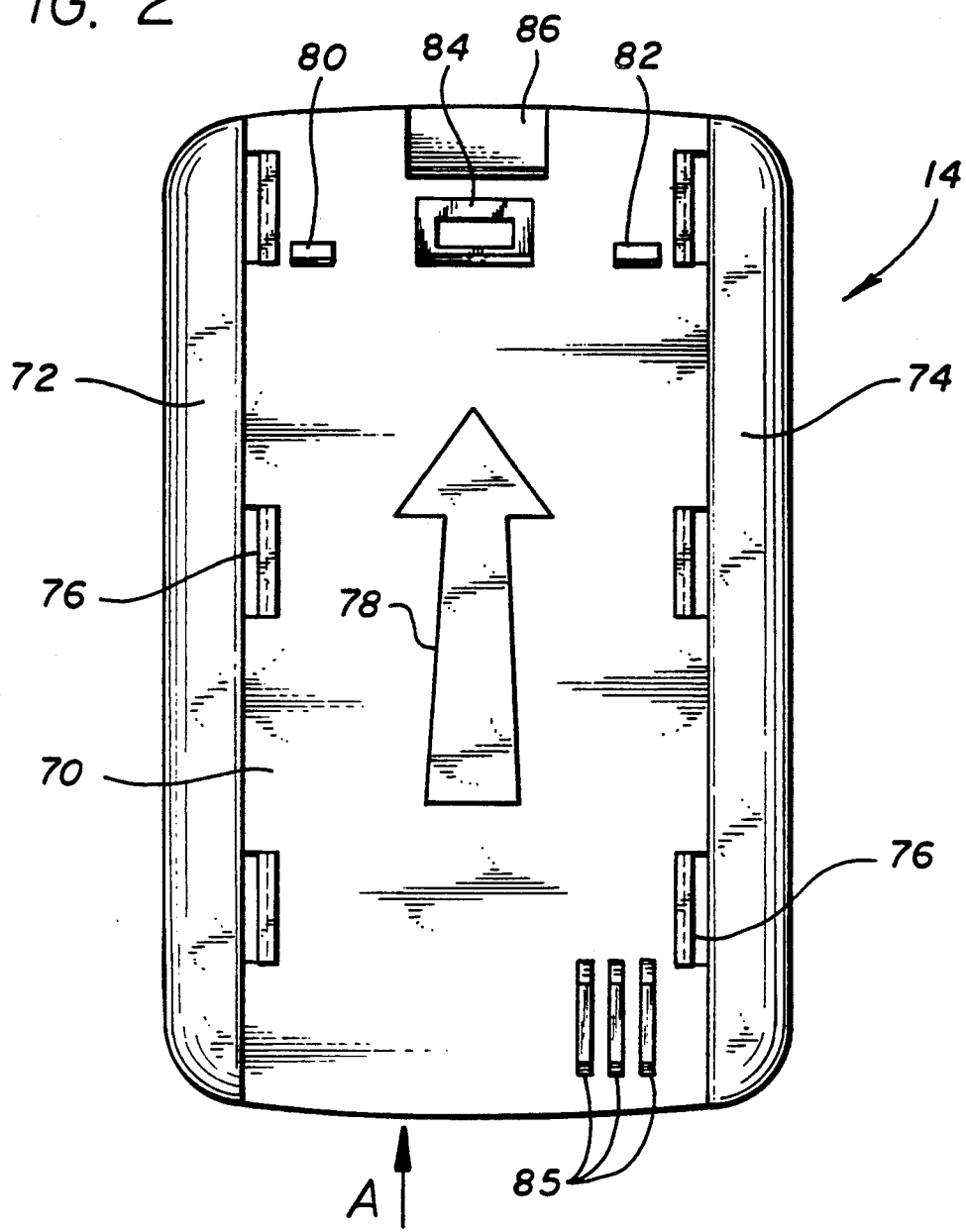
FIG. 2 is a top view of the upper plate of the charging device shown in FIG. 1.
Figure 3:
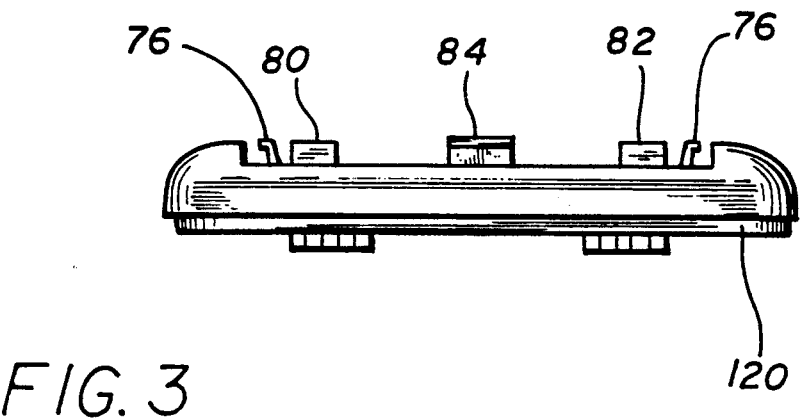
FIG. 3 is an end view of the charging device shown in FIG. 2, seen from the direction of arrow A.
Figure 6:
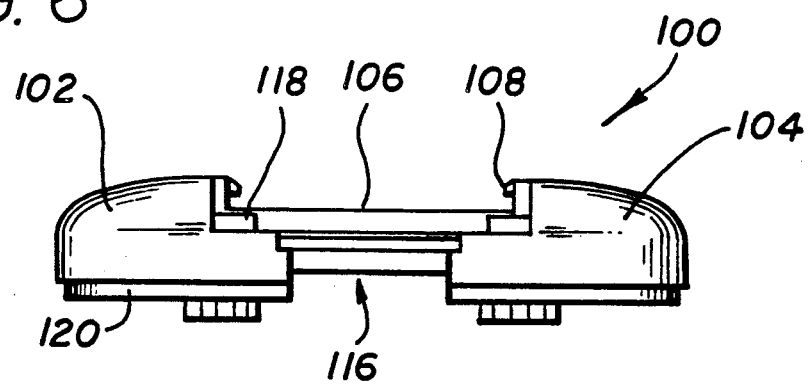
FIG. 6 is an end view seen from the direction of arrow B of the top plate shown in FIG. 5 of the drawings.

The lower casing 12 comprises a base wall 20 and a side wall 22. The base wall 20 and side wall 22 define a chamber 24 which houses the electronic equipment of the battery charger 10. In FIG. 1 of the drawings, only a sample of electronic components 26 is shown for illustrative purposes.

The inner surface 28 of the side wall 22 includes a number of posts 30 each having a flat upper surface 32. The flat upper surfaces 32 support the outer periphery of the intermediate plate 16, when the plate 16 is located in the chamber 24. The intermediate plate 16 is secured to the lower casing 12 by means of a pair of screws 34a and 34b, the screws being received in wells 36a and 36b in the base wall 20 of the lower casing. The intermediate plate 16 in use covers and protects the electronic components 26 located in the chamber 24. The intermediate plate 16 has a square recess 38, which provides access to a connector outlet 40 mounted on the base wall 20. The connector outlet 40 is adapted to be connected to the connector plug 42 attached to the upper plate 14 as described below. In this way, the electronic components 26 electrically connect to the upper plate 14.

The electronic components 26 are also connectable through appropriate leads (not shown) to a cable extending from the battery charger 10, which cable can be connected to a conventional electric outlet in the home or office or any 12 V outlet in a vehicle, with an appropriate adapter. In this way, power is supplied to the battery charger 10.

The upper end 44 of the side wall 22 has four apertures. Aperture 46 is a plug by means of which the battery charger 10 may be connected to the outlet of a conventional office or house electric supply or any 12 V outlet in a vehicle, with appropriate adapter. Aperture 48 is designed to accommodate a button whereby all charge remaining in a battery attached to the battery charger may be discharged before the charging function is initiated. Apertures 50 and 52 accommodate red and green lights respectively. In a typical operation, the red light will be illuminated when the battery is discharging. The green light will illuminate continuously when the battery is being quick charged and in a flashing mode when the battery is being trickle charged. Once charging has completed, the green light will switch off. The red light will flash if the battery is poor or defective, i.e., the battery cannot be charged to its rated voltage. However, any suitable formula or color light for advising the user of the current status may be used.

The side wall 22 has an outer lip 54 and an inner lip 56. The inner and outer lips 56 and 54 respectively receive and register with corresponding portions on the upper plate 14, to be described more fully below. The lower casing 12 also has mounted within the chamber 24 a pair of screw wells 58 and 60. The screw wells 58 and 60 extend through apertures 62 and 64 of the intermediate plate 16 and register with wells 66 and 68 on the lower side of the upper plate 14, as shown in FIG. 4 of the drawings, and as discussed further below. The screw 18a extends through the screw well 58, and the aperture 62, and engages in the screw well 66. The screw 18b extends through the well 60 and aperture 64 and engages in well 68.

The upper plate 14 will now be described with particular reference to FIGS. 1, 2, 3 and 4 of the drawings. The upper plate 14 comprises a battery receiving surface 70 and a pair of edge walls 72 and 74. Six tracking members 76 are located on the receiving surface 70, are arranged in pairs, with three such tracking members 76 being located directly adjacent each edge wall 72 and 74 respectively. The distance between a pair of tracking members 76 approximates substantially the width of a battery to be charged, so that the battery is snugly contained on the receiving surface 70. The battery is inserted on the upper plate 14 and slides thereon in the direction of the arrow 78 shown in the center of the upper plate.

A pair of stoppers 80 and 82 are provided to prevent sliding of the battery over the end of the upper plate 14. A central stopper and locking device 84 is provided whereby the battery may be locked on to the upper plate 14. The upper plate 14 further includes a recess 86 to facilitate removal of the battery, once charged.

Three charging contacts 85 are located on the receiving surface 70, and are adapted to contact corresponding electrical contacts on the battery. The charging contacts 85 are mounted over three pairs of contact apertures 87, with each charging contact extending between a pair of contact apertures so that a part of the charging contact is on the receiving surface 70, while a portion of the contact 85 extends through the upper plate 14, and is connected through leads 88 (see FIG. 1) to the connector plug 42. Leads 88 are connected to a selected pair of contacts 85 dependent upon the type of battery being charged.

Reference is now made to FIG. 5 of the drawings, which shows another upper plate 100 adapted to be mounted on the lower casing 12. The upper plate 100 has a pair of edge walls 102 and 104 which define between them a battery receiving surface 106. Three pairs of tracking members 108 guide the battery between the edge walls 102 and 104 over the receiving surface 106 in a similar manner to that described with respect to FIG. 2 of the drawings. An arrow 110 provides the user with an indication of the direction in which the battery is to be inserted on the battery receiving surface 106. Three charging contacts 112 are provided, each charging contact 112 being mounted on the receiving surface 106 between a pair of apertures 114. Two of the charging contacts are adapted to contact corresponding charging contacts on the battery and also connect to leads 88 which are attached to the connector plug 42. A recess 116 is provided at one end of the upper plate 100, and this facilitates removing the battery from the upper plate 100, when charged. A pair of springs 118 are provided on each side of the recess and are adapted to engage corresponding recesses on the battery to firmly hold it in position while being charged, and eject the battery when released.

Figure 7:
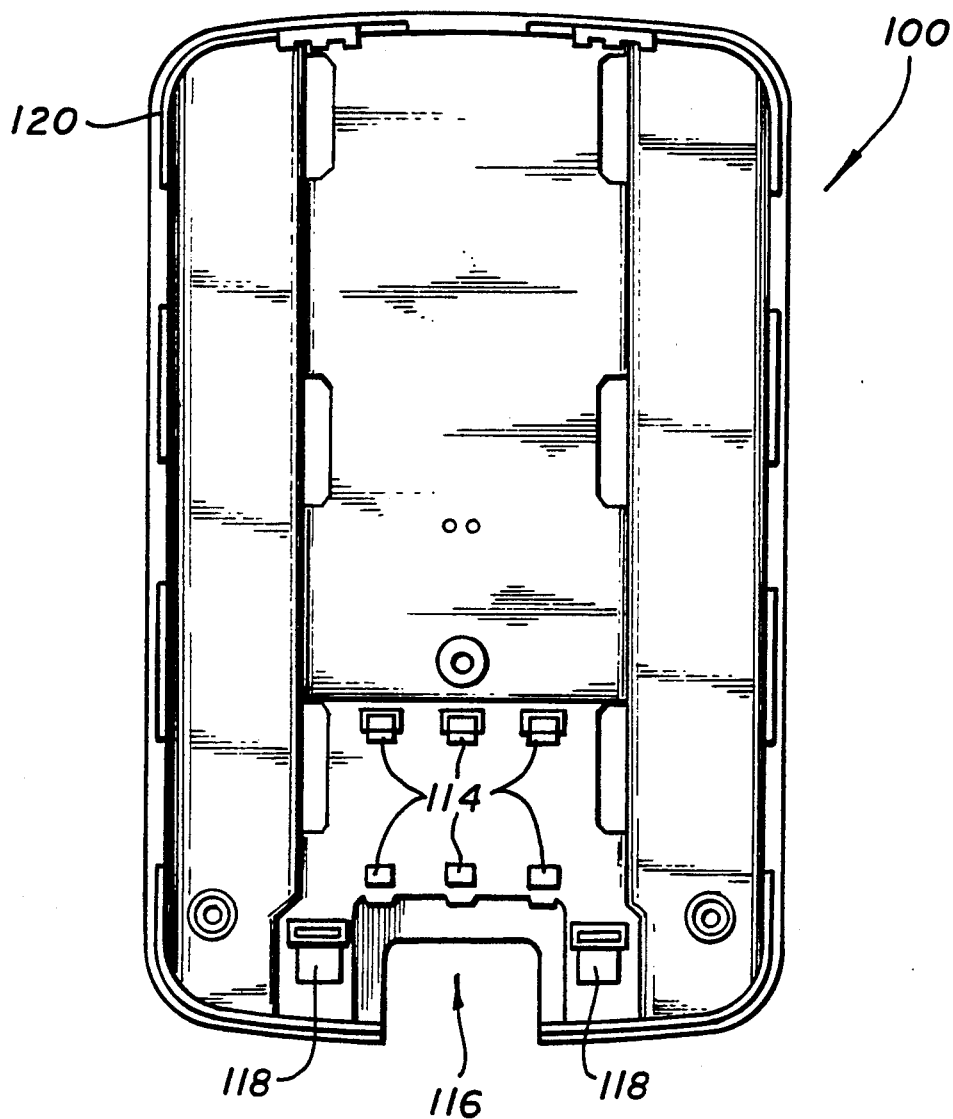

With reference to FIG. 4 and FIG. 7, it is to be noted that upper plate 14 and upper plate 100 both have a peripheral lip 120 whereby the upper plate may be snugly attached to the lower casing 12.

Reference is made to FIG. 11 of the drawings. In this figure, the battery charger device 10 of the invention has a lower casing 12 with a rolled flange 122 along each of the longer edges. The flange 122 defines a channel 124. An upper plate 126 has running along its edges an inward flange 128 which is adapted to be received within the channel 124. The upper plate slides very easily onto and off the lower casing. This facilitates easy replacement of the upper plate without the need to remove the screws 18.

The upper plate 14 is easily and efficiently connected electrically to the electronic components 26 in the lower casing by attaching the connector plug 42 to the connector outlet 40. The connector outlet 40 has five pins, which are received within five recesses in the connector plug 42. Pins 130 and 132 are electrical connectors carrying charging current for the battery, while pins 134, 136 and 137 operate as switch contacts.

It is to be noted that different batteries in the market have different capacities, i.e., different requirements in terms of the charging current and voltage which must be supplied. The two main types of battery in the market today are 6 V (generally low capacity) and 7.2 V (generally high capacity) batteries. The electronic components contained within the battery charger 10 are adapted to vary the output through the connector outlet according the type of battery being charged.

In the connector plug, two apertures 138 and 140, receive the electrical pins 130 and 132. The other apertures 142, 144 and 45 which connect to pins 134, 136 and 137, respectively, operate as a switching means which affects the output of the electronic components 26. The short jumper wire shown connected between apertures 140 and 142 in FIG. 1 represent a first switching configuration while removal of the jumper represents a second switching configuration. In the first switching configuration, the electronic components will provide the appropriate charging current and voltage for a 6 V battery while in the second switching configuration, the charging current and voltage output will be varied to meet the requirements of a 7.2 V battery. Therefore, according to the type of connector plug 42 in use, the appropriate output requirements will be met to correspond with the voltage requirements of the battery being charged.

The short jumper wire shown connected between apertures 144 and 145 in FIG. 1 represent a third switching configuration, while removal of the jumper represents a fourth switching configuration. In the third switching configuration, the electrical components will provide a high capacity charge to the battery, while in the fourth switching configuration, the electrical components will provide a low capacity charge.

With reference to FIGS. 10A and 10B, assuming that the AC line voltage has been stepped down and rectified to produce an unregulated DC input voltage by the aforementioned conventional adapter, the unregulated input voltage is applied to terminal 201 of the DC input voltage regulator 203. When the battery is to be charged, the output of voltage regulator 203 is applied to the output voltage terminal 205 which is connected to the battery 207 being charged.

Prior to charging, however, the battery may require discharging. When the discharging function is selected by pressing switch 208 in the discharge selector switch block 210, a charger regulator controller 209 is commanded by a microprocessor/gate logic IC 211 to electronically interrupt the output voltage from voltage regulator 203 to the output line 213 (via $Q_1$ and $Q_3$). At the same time, microprocessor 211 enables discharge circuit 215 which controllably passes current out of the positive terminal of battery 207 through discharge circuit 215 to ground 217. Microprocessor 211 also simultaneously lights the red LED 233 to give a visual indication that the battery is being discharged.

After the battery 207 has been sufficiently discharged, microprocessor 211 disables discharge circuit 215 and enables the controller 209, the latter function recoupling the output of voltage regulator 203 to output line 213 via $Q_4$. Battery 207 will then receive a charge from output voltage terminal 205 via wires 88, connector plug 42, and connector outlet 40 (FIG. 1). Simultaneously, microprocessor 211 lights the green LED 237 to visually indicate a charging condition.

The output voltage at terminal 205 is sent to battery voltage selector 219 which outputs a modified version of the sensed voltage at terminal 205, the output being a proportion of the sensed voltage, and the proportion is different depending on whether the battery being charged is a 6 volt battery or a 7.2 volt battery. The plug 42 (apertures 140, 142) determines this as mentioned above. The output of selector 219 on line 223 is therefore normalized to the same output level independent of whether the input to selector 219 is 6 volts or 7.2 volts, due to the jumper between apertures 140 and 142 (and therefore the connection between pins 132 and 134) being in place or not. In this manner, the remainder of the charger circuit can operate in identically the same way independent of whether the battery being charged is a 6 volt battery or a 7.2 volt battery.

The normalized output voltage from selector 219 is sent to "full trickle" sensor 225 which outputs control signals on lines 231 or 235 to microprocessor 211 depending upon the voltage sensed at terminal 205 by selector 219. If the battery voltage at terminal 132 is below a predetermined value set by the bias on differential amplifier 229, the output of amplifier 229 signals microprocessor 211 to provide the battery with a full charge. On the other hand, if the battery voltage at terminal 132 exceeds a somewhat greater voltage than the aforementioned predetermined voltage, as set by the bias on differential amplifier 227, the output of amplifier 227 signals microprocessor 211 to provide the battery with a trickle charge. The amount of charge, full or trickle, is set by controlling the output of the DC regulator 203 by microprocessor 211 via charger controller 209. Transistors $Q_1$ and $Q_3$ are pulsed to cause the output of DC regulator 203 to be greater for a higher on-to-off duty cycle of $Q_3$ and to be less for a lower duty cycle of $Q_3$. Thus, the full charge mode results when $Q_1$, $Q_3$ and DC regulator 203 are pulsed with a high duty cycle, and a trickle charge mode results when pulsed at a low duty cycle.

If the battery is already near its fully charged state, the output from differential amplifier 227 on line 231 will indicate to the microprocessor 211 that only a trickle charge is necessary, and the controller line 209 will adjust the voltage regulator 203 and enable the green LED 237 in a flashing condition so that the user will have a visual indication of that condition.

On the other hand, if the input voltage to sensor 225 on line 223 is lower than a prescribed level, as sensed by the differential amplifier 229, the output 235 of differential amplifier 229 will instruct the microprocessor 211 that the battery needs quick charging. The microprocessor 211, in turn, activates controller 209 into a high duty cycle state to enable the DC voltage regulator 203 accordingly, and simultaneously lights the green LED 237 in a continuous mode to indicate that the battery is being quick charged and has not yet reached its intermediate potential which would automatically disable amplifier 229 and enable amplifier 227 to begin the trickle mode of operation.

Voltage sensor and limit circuit 241 has as an input, a branch from the output voltage terminal 205 on line 243. Thus, the voltage sensor and limit circuit 241 determines whether or not the output voltage at terminal 205 is within prescribed limits, for example, between 1 volt and 10 volts, and if so, provides an output on line 245 to maintain the microprocessor 211 in its enabled state. On the other hand, in the event that the battery 207 is defective and represents a dead short circuit (e.g., line 213 is at a potential below 1 volt), or if a malfunction in the regulator 203 or its input occurs and the voltage at the output terminal 205 exceeds 10 volts, the sensor and limit circuit 241 alerts the microprocessor along line 245 so that the microprocessor 211 can turn the charger off via controller 209. A potentiometer 247 is provided to vary the high end of the allowable range of 1–10 volts for the voltage on output terminal 205.

A basic clock generator 249 is provided for standard timing functions of the microprocessor as is common in the art.

To avoid possible damage to a battery resulting from overcharge, a time limit circuit 251 receives a clock signal on line 253 from microprocessor 211 and counts the clock pulses. At a prescribed number of pulses, i.e., representing a prescribed amount of time passage, an output on line 255 instructs microprocessor 211 to shut down the system by disabling the voltage regulator through the controlling of charge controller 209.

The battery charging device of the invention, while particularly suitable for charging batteries used with portable telephones, may also charge batteries for video cameras, CB radios, trunk radios, portable computers, CD players and the like. The casing and components are comprised of metal or appropriate plastics which are able to withstand the heat generated during the charging process.

While two particular upper plates 14 have been described above, it is to be understood that the basis of the invention that any upper plate which is readily interchangeable with the lower casing so that a wide variety of batteries can be charged using the battery charger 10 of the invention. In this way, most parts of the unit remain the same and only a surface plate which engages and holds the battery during charging need be changed to suit the particular specifications of the battery.

The invention is not limited to the precise constructional details described above. For example, the casing may be of a different size or shape, have different indicating lights and may connect to the upper plate in any suitable manner.

I claim:

1. A battery charger comprising a housing; charge means in the housing which can be connected to an electrical outlet; an upper plate releasably attached to the housing, the upper plate having battery receiving means to accommodate a predetermined size battery, wherein a plurality of upper plates each having differently shaped receiving means may be attached to the housing.

2. A battery charger as claimed in claim 1 wherein the housing comprises a base and side wall which define a chamber, the chamber accommodating the charging means.

3. A battery charger as claimed in claim 2 further comprising an intermediate plate between the housing and the upper plate, the charging means being enclosed by the housing and the intermediate plate.

4. A battery charger as claimed in claim 1 wherein the upper plate comprises a flat surface, a pair of edgewalls defining a battery receiving area, and tracking means for properly guiding a battery into position on the upper plate.

5. A battery charger is claimed in claim 4 wherein the upper plate further comprises electrical contacts for contacting the battery, the electrical contacts also being connected to the charging means.

6. A battery charger as claimed in claim 1 wherein the upper plate comprises a peripheral flange and the housing comprises a peripheral shelf, the flange being receivable on the shelf to facilitate attachment between the housing and the upper plate.

7. A battery charger as claimed in claim 1 wherein the upper plate is formed to receive batteries requiring 7.2 volt charging means.

8. A battery charger as claimed in claim 1 wherein the upper plate is formed to receive batteries requiring 6.0 volt charging means.

9. A battery charger as claimed in claim 1 further comprising releasable electrical connecting means between the charging means in the housing and the upper plate.

10. A battery charger as claimed in claim 9 wherein the electrical connecting means comprises a multiple pin assembly in the housing, the multiple pin assembly being connected to the charging means, and a socket member attached to the upper plate, the socket member being connectable to the multiple pin assembly.

11. A battery charger as claimed in claim 10 wherein the multiple pin assembly comprises five pins, wherein two of the pins are for transmitting charge from the charging means to the upper plate, and the socket member comprises five apertures to receive the five pins, wherein two of the apertures correspond to the two pins.

12. A battery charger as claimed in claim 11 wherein three pins of the multiple pin assembly and three apertures in the socket member operate as switching means, the configuration of the three pins in relation to the three apertures determining the level and extent of electrical charge being transmitted to the upper plate.

13. A battery charger as claimed in claim 1 wherein the housing comprises a rolled flange along the edge thereof, the rolled flange defining a groove, and the upper plate comprises a flange along its edge, the flange of the upper plate being slideably received in the groove of the rolled flange on the housing so that the upper plate slides on and off the housing for easy removal and replacement.

14. A battery charger as claimed in claim 1 further comprising battery discharge means whereby the battery located on the upper surface can be fully discharged prior to charging.

15. A battery charger as claim 1 further comprising indicating lights for indicating the status of the battery being charged.

16. A battery charger as claimed in claim 1 further comprising charging contacts suitably located on the upper plate so as to be in contact with the battery on the upper plate to convey electrical charge thereto.

17. A battery charger as claimed in claim 1 further comprising locking means for releasably locking the battery in position on the upper plate.

18. A battery charger as claimed in claim 1 wherein the charging means comprises:
   first circuit means for sensing a charged condition of the battery received in the upper plate; and
   second circuit means, responsive to the first circuit means for applying a full charge or a trickle charge to the battery according to the sensed charged condition of the battery.

19. A battery charger as claimed in claim 1, wherein the charging means comprises:
   a charging circuit having high and low charging capacity modes; and
   means for selectively configuring the charging circuit to one of the capacity modes for selectively charging relatively high and low capacity batteries, respectively; and wherein
   the upper plate comprises selecting means for the charging circuit to one of the high and low capacity modes.

20. A battery charger as claimed in claim 1, wherein the charging means comprises:
   a charging circuit having high and low battery voltage modes; and
   means for selectively configuring the charging circuit into one of the high battery voltage and low battery voltage modes for selectively charging relatively high and low voltage batteries, respectively; and wherein
   the upper plate comprises selecting means for the charging circuit to one of the high and low battery voltage modes.

21. A battery charger as claimed in claim 19, wherein:
   the upper plate comprises charging contacts to electrically engage electrical terminals on the battery received in the battery receiving means;
   the selecting means of the charging circuit comprises a multiple contact connector means coupled between the electrical terminals on the upper plate and the charging circuit, the connector means having a plurality of contacts and a jumper selectively bridging a pair of the contacts.

22. A battery charger as claimed in claim 20, wherein:
   the upper plate comprises charging contacts to electrically engage electrical terminals on the battery received in the battery receiving means;
   the selecting means of the charging circuit comprises a multiple contact connector means coupled between the electrical terminal on the upper plate and the charging circuit, the connector means having a plurality of contacts and a jumper selectively bridging a pair of the contacts.

* * * * *